United States Patent
Kang et al.

(10) Patent No.: US 8,896,160 B2
(45) Date of Patent: *Nov. 25, 2014

(54) APPARATUS AND METHOD OF CONTROLLING SWITCH UNITS, AND BATTERY PACK AND BATTERY MANAGEMENT APPARATUS COMPRISING SAID APPARATUS

(71) Applicant: LG Chem, Ltd., Seoul (KR)

(72) Inventors: Ju-Hyun Kang, Daejeon (KR); Jee-Ho Kim, Daejeon (KR); Dong-Keun Kwon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/032,416

(22) Filed: Sep. 20, 2013

(65) Prior Publication Data

US 2014/0021800 A1     Jan. 23, 2014

Related U.S. Application Data

(63) Continuation of application No. 12/699,147, filed on Feb. 3, 2010, now Pat. No. 8,564,156, which is a continuation of application No. PCT/KR2009/004926, filed on Sep. 1, 2009.

(30) Foreign Application Priority Data

Sep. 1, 2008 (KR) .................. 10-2008-0085762
Sep. 1, 2009 (KR) .................. 10-2009-0082215

(51) Int. Cl.
*H02J 1/00* (2006.01)
*H01H 33/59* (2006.01)
*B60L 11/18* (2006.01)
*H02M 1/32* (2007.01)
*H02J 1/08* (2006.01)
*H02J 7/00* (2006.01)

(52) U.S. Cl.
CPC *H02J 1/00* (2013.01); *H01H 33/59* (2013.01); *B60L 2210/10* (2013.01); *H02J 1/08* (2013.01);
*Y02T 10/7061* (2013.01); *Y02T 10/7216* (2013.01); *H02J 7/0063* (2013.01); *B60L 11/1805* (2013.01); *H02M 1/32* (2013.01); *Y02T 10/7005* (2013.01); *B60L 2240/547* (2013.01); *B60L 11/1864* (2013.01)
USPC .......................................... 307/115; 307/150

(58) Field of Classification Search
USPC ........ 361/3–8, 166, 167; 307/9.1, 10.1, 10.7, 307/41, 81, 98, 113, 115, 134, 140, 150
See application file for complete search history.

(56) References Cited

U.S. PATENT DOCUMENTS 7,688,023 B2    3/2010   Yoon et al.
8,564,156 B2 *  10/2013  Kang et al. .................. 307/98

(Continued)

FOREIGN PATENT DOCUMENTS

EP     1 839 929 A2    10/2007
JP     2-95142 A       4/1990

(Continued)

*Primary Examiner* — Fritz M Fleming
(74) *Attorney, Agent, or Firm* — Birch, Stewart, Kolasch & Birch, LLP

(57) ABSTRACT

Disclosed are an apparatus and method of controlling switch units between a battery pack and a load, and a battery pack and a battery management system comprising the same. The apparatus comprises a memory for storing the turn-off number and order of first and second switch units connecting the battery pack with the load according to current ranges; and a control unit for equalizing the turn-off order of the first switch unit and the second switch unit with reference to the turn-off number and order in a current range corresponding to a magnitude level of discharge current of a battery. Accordingly, the present invention reduces the frequency of breakdown or malfunction of the switch units and increases the using period of the switch units.

19 Claims, 3 Drawing Sheets

(56) References Cited

U.S. PATENT DOCUMENTS

| | | | |
|---|---|---|---|
| 8,710,697 B2 * | 4/2014 | Leonard et al. | 307/29 |
| 2005/0231029 A1 | 10/2005 | Sakata | |
| 2008/0068116 A1 | 3/2008 | Marukawa et al. | |
| 2008/0092258 A1 | 4/2008 | Clarke et al. | |
| 2009/0039703 A1 | 2/2009 | Soma et al. | |
| 2009/0230765 A1 | 9/2009 | Gabor et al. | |
| 2012/0013182 A1 | 1/2012 | Minegishi et al. | |

FOREIGN PATENT DOCUMENTS

| | | |
|---|---|---|
| JP | 8-126213 A | 5/1996 |
| JP | 2005-295697 A | 10/2005 |
| JP | 2007-288899 A | 11/2007 |
| JP | 2008-154371 A | 7/2008 |
| KR | 10-1998-0012814 A | 4/1998 |
| KR | 10-2007-0047384 A | 5/2007 |
| KR | 10-2008-0037941 A | 5/2008 |

* cited by examiner

APPARATUS AND METHOD OF CONTROLLING SWITCH UNITS, AND BATTERY PACK AND BATTERY MANAGEMENT APPARATUS COMPRISING SAID APPARATUS

CROSS-REFERENCE TO RELATED APPLICATION

This application is a Continuation of application Ser. No. 12/699,147 filed on Feb. 3, 2010, which is a continuation of International Application No. PCT/KR2009/004926, filed on Sep. 1, 2009, which claims priority under 35 U.S.C. 119(a) to Korean Patent Application No. 10-2008-0085762 filed on Sep. 1, 2008 and Korean Patent Application No. 10-2009-0082215 filed on Sep. 1, 2009, all of which are hereby expressly incorporated by reference into the present application.

BACKGROUND OF THE INVENTION

1. Field of the Invention

The present invention relates to an apparatus and method of controlling switch units, and in particular, to an apparatus and method of controlling switch units installed between a battery pack and a load, and a battery pack and a battery management system comprising said control apparatus.

2. Description of the Related Art

Vehicles using fossil fuel, such as gasoline, diesel and so on, generate a lot of harmful exhaust gases and pollute the air. The harmful exhaust gas is one of factors affecting global warming and exerts an injurious effect upon global environment. To solve this problem, attempts have been made to develop vehicles reducing fossil fuel consumption or running on alternative fuel. And, recently, interests are centered on HEV (Hybrid Electrical Vehicle) or EV (Electrical Vehicle) capable of running on an electrical energy supplied from a high-capacity battery pack.

HEV can run by an engine consuming fossil fuel and a motor driven by an electrical energy supplied from a battery pack. HEV includes HCU (Hybrid Control Unit). At the time of applying the brake or reducing the speed of HEV, a power mode is converted to a generation mode under the control of the HCU. Then, the battery pack is charged with an electrical energy output from a generator connected with the engine under the control of BMS (Battery Management System) connected with the HCU. In a power mode, the electric current is supplied from the battery pack to the motor and the motor drives the vehicle.

The battery pack and the motor corresponding to a load are connected with each other through a relay switch unit. In turn, the connection between the battery pack and the load is released by controlling the relay switch unit.

FIG. 1 is a circuit diagram conceptually illustrating a connection of a battery pack and a load through a relay switch unit.

Referring to FIG. 1, a relay switch control method according to the conventional art is described as mentioned below.

To connect a battery pack 10 with a load 40, first a (−) side relay switch unit 30 is turned on. Next, a free charge switch unit 22 is turned on, so that electric current, of which a magnitude level is limited by a current limiting resistor (R) connected in series with the free charge switch unit 22, is applied to the load 40. Under this condition, after a predetermined time passes, a (+) side relay switch unit 20 is turned on and the free charge switch unit 22 is turned off. In this way, the battery pack 10 and the load 40 are connected with each other.

Here, the use of the free charge switch unit 22 in connecting the battery pack 10 with the load 40 prevents in-rush current from being applied to the load 40 when connecting the battery pack 10 with the load 40.

On the contrary, the connection between the battery pack 10 and the load 40 is released by turning off the (+) and (−) side relay switch units 20 and 30 in a preset order.

When the relay switch unit is turned off, arc generates at a contact of the relay switch unit due to the relay's inductance component. The generated arc damages the contact of the relay switch unit, and consequently, reduces the using period of the relay switch unit.

According to the conventional relay switch control method, a manipulation order of the relay switch unit is preset, and consequently, damage caused by arc is relatively concentrated on any one relay switch unit. As a result, it increases the frequency of breakdown and malfunction occurring to any one of two relay switch units and reduces the switch unit replacement cycle.

SUMMARY OF THE INVENTION

The present invention is designed to solve the problems of the conventional art, and therefore it is an aspect of the present invention to provide an apparatus and method of controlling switch units connecting a battery pack with a load, capable of reducing the frequency of breakdown and malfunction of the switch units and increasing the using period of the switch units.

An apparatus of controlling switch units between a battery pack and a load according to the present invention comprises a memory for storing the turn-off number and order of a first switch unit and a second switch unit connecting the battery pack with the load according to current ranges; and a control unit for equalizing the turn-off order of the first switch unit and the second switch unit with reference to the turn-off number and order of the switch units in a current range stored in the memory, the current range being corresponding to a magnitude level of discharge current of a battery.

In the present invention, the first switch unit may be installed on a high potential line connecting a cathode of the battery pack with the load, and the second switch unit may be installed on a low potential line connecting an anode of the battery pack with the load.

Preferably, when releasing the connection between the battery pack and the load, the control unit detects a magnitude level of discharge current, reads, from the memory, the turn-off number and order of the switch units in a current range corresponding to the magnitude level of discharge current, among current ranges in the memory, and equalizes the turn-off order of the first switch unit and the second switch unit using the read turn-off number and order of the switch units.

According to an aspect of the present invention, the control unit first turns off a switch unit having a smaller turn-off number among the first switch unit and the second switch unit.

According to another aspect of the present invention, in the case that the first switch unit and the second switch unit have the same turn-off number, the control unit first turns off a switch unit that was not turned off most recently.

The apparatus according to the present invention may further comprise a free charge switch unit installed on a bypass line of the high potential line; and a current limiting resistor connected in series with the free charge switch unit.

Preferably, when connecting the battery pack with the load, the control unit turns on the second switch unit, the free charge switch unit and the first switch unit in sequence, and after the first switch unit is turned on and a predetermined time passes, turns off the free charge switch unit.

Preferably, the control unit updates the turn-off number and order of the first switch unit and the second switch unit in a current range corresponding to a magnitude level of discharge current at the point of time when the connection between the battery pack and the load is released, and stores the updated turn-off number and order in the memory.

Meanwhile, the switch unit control apparatus according to the present invention may be comprised in a battery pack or a battery management system as a component.

A method of controlling switch units between a battery pack and a load according to the present invention comprises (a) storing and managing the turn-off number and order of a first switch unit and a second switch unit connecting the battery pack with the load in a memory according to current ranges; (b) detecting a magnitude level of discharge current of a battery at the point of time when a connection between the battery pack and the load is released; and (c) releasing the connection between the battery pack and the load on condition that the turn-off order of the first switch unit and the second switch unit is equalized with reference to the turn-off number and order of the first switch unit and the second switch unit in a current range stored in the memory, the current range being corresponding to the detected magnitude level of discharge current.

EFFECTS OF THE INVENTION

The present invention equalizes the turn-off number of the switch units according to a magnitude level of discharge current applied to the load when releasing a connection between the battery pack and the load, thereby reducing the frequency of breakdown or malfunction of the switch units and increasing the using period of the switch units.

BRIEF DESCRIPTION OF THE DRAWINGS

The accompanying drawings illustrate the preferred embodiments of the present invention and are included to provide a further understanding of the spirit and scope of the present invention together with the detailed description of the invention, and accordingly, the present invention should not be limitedly interpreted to the matters shown in the drawings.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 2:
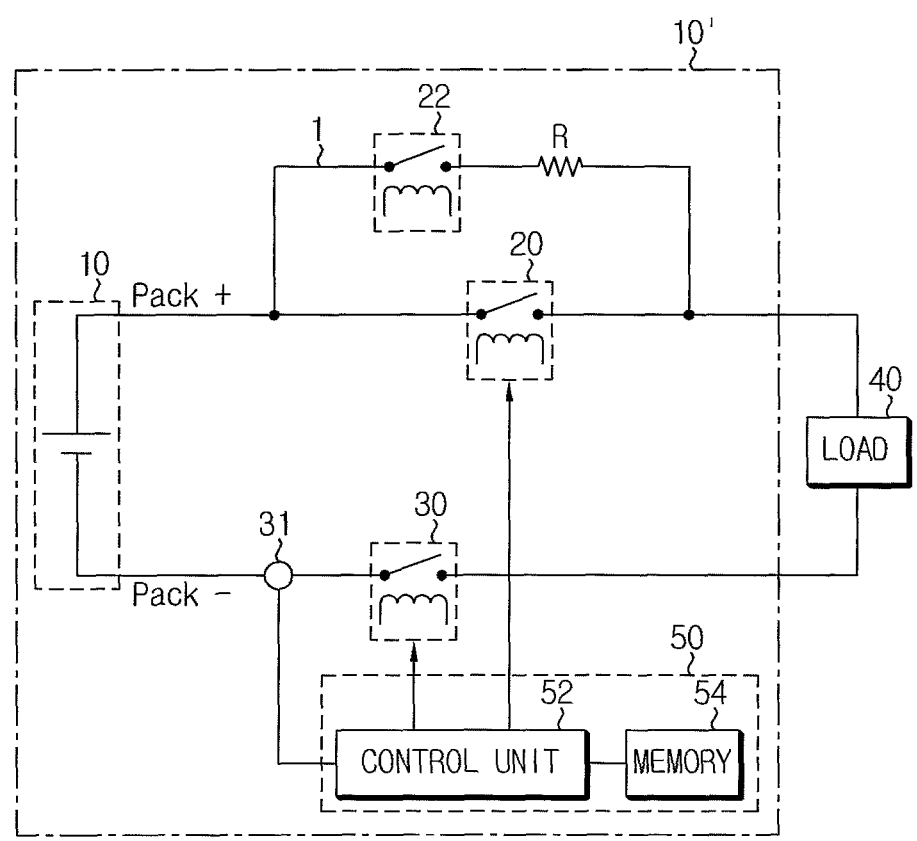
FIG. 2 is a circuit diagram illustrating an apparatus of controlling switch units between a battery pack and a load according to a preferred embodiment of the present invention.

FIG. 2 is a circuit diagram illustrating an apparatus of controlling switch units between a battery pack and a load according to a preferred embodiment of the present invention.

As shown in FIG. 2, the apparatus 50 according to the present invention controls the operation of a first switch unit 20, a free charge switch unit 22 and a second switch unit 30 that are installed on a transmission line supplying a power output from a battery pack 10 to a load 40.

The first switch unit 20 is installed on a high potential line (Pack+) connecting a cathode of the battery pack 10 with the load 40. The second switch unit 30 is installed on a low potential line (Pack−) connecting an anode of the battery pack 10 with the load 40. And, the free charge switch unit 22 is installed on a bypass line 1 of the high potential line, and connected in series with a current limiting resistor (R).

Preferably, the first switch unit 20, the free charge switch unit 22 and the second switch unit 30 may be relay switch units. However, the present invention is not limited to the type of switch units connecting the battery pack 10 with the load 40.

The battery pack 10 comprises a cell assembly having a plurality of unit cells connected in series or in parallel that are capable of repetitive charging and discharging. The unit cell is an electric double-layer capacitor comprising an ultra capacitor, or a well-known secondary battery such as a lithium ion battery, a lithium polymer battery, a nickel cadmium battery, a nickel hydrogen battery, a nickel zinc battery and so on.

The load 40 is a motor that receives electric power from the battery pack 10 and generates driving power, a DC-DC converter that converts a discharge voltage applied from the battery pack 10 from one voltage level to another voltage level, and so on. However, the present invention is not limited to the type of the load 40. Accordingly, it should be understood that the load 40 includes any device or system for receiving electric power from the battery pack 10.

The apparatus 50 according to the present invention comprises a memory 54 and a controller 52. The memory 54 stores a magnitude level of discharge current applied from the battery pack 10 to the load 40 and the turn-off number and order (for example, the most recent operation order) of the first and second switch units 20 and 30. The control unit 52 controls the operation of the first and second switch units 20 and 30 and the free charge switch unit 22 by applying operation control signals thereto.

Figure 1:
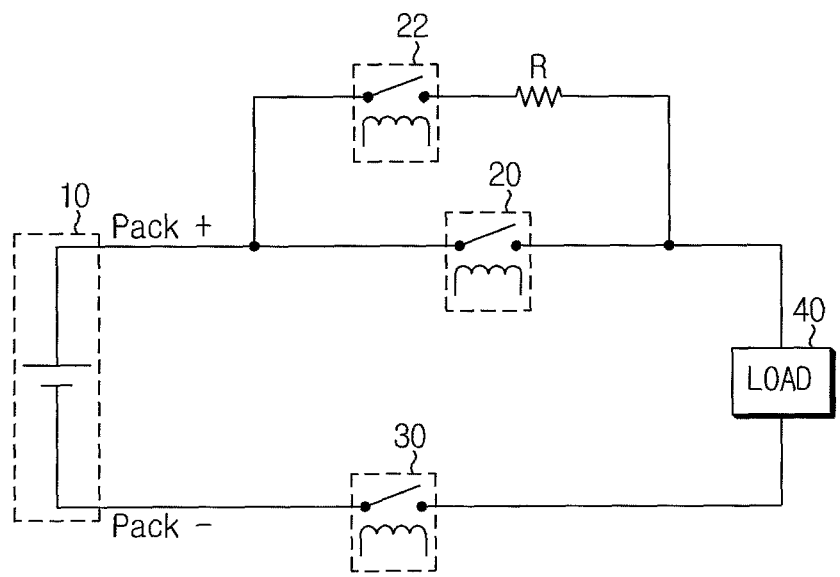
FIG. 1 is a circuit diagram conceptually illustrating a connection between a battery pack and a load through a relay switch unit.

When connecting the battery pack 10 with the load 40, the control unit 52 turns on the second switch unit 30, the free charge switch unit 22 and the first switch unit 20 in sequence, and after the first switch unit 20 is turned on and a predetermined time passes, turns off the free charge switch unit 22. This switch unit manipulation order is the same as the conventional art described with reference to FIG. 1 as mentioned above.

When releasing the connection between the battery pack 10 and the load 40, the control unit 52 does not fixedly maintain the turn-off order of the first and second switch units 20 and 30, but equalizes the turn-off order of the first and second switch units 20 and 30 according to a magnitude level of discharge current by flexibly adjusting the present turn-off order of the switch units with reference to the magnitude level of discharge current applied from the battery pack 10 to the load 40 and the past turn-off number and order of the switch units corresponding to the magnitude level of discharge current, stored in the memory 54.

In other words, if there is a connection release request between the battery pack 10 and the load 40, the control unit 52 detects a magnitude level of discharge current applied from the battery pack 10 to the load and determines a current range corresponding to the detected magnitude level of discharge current in the memory 54. Next, the control unit 52 reads, from the memory 54, the past turn-off number and order of the first and second switch units 20 and 30 in the determined current range. Here, the connection release request may be input from an external system such as a battery management system and so on. Alternatively, the connection release request may be generated according to schedule preset in the control unit 52. Subsequently, the control unit 52 first turns off a switch unit having a smaller turn-off number in consideration of the past turn-off number and order of the first and second switch units 20 and 30. Meanwhile, in the case that the first and second switch units 20 and 30 have the same turn-off number, the control unit 52 first turns off a switch unit that was not turned off most recently to release the connection between the battery pack 10 and the load 40. And, the control unit 52 updates the turn-off number and order of the first and second switch units 20 and 30 in a current range corresponding to a magnitude level of discharge current of the battery at the point of time when the connection between the battery pack 10 and the load 40 is released, and stores the updated turn-off number and order in the memory 54. In this way, the connection between the battery pack 10 and the load 40 is released.

The below-mentioned table 1 shows an example of the turn-off number and order of the switch units according to a current range of discharge current. In the table 1, '0' in the parenthesis means that a switch unit was not turned off most recently, and '1' means that a switch unit was turned off most recently. For example, in the middle current range, immediately before when the connection between the battery pack and the load was released, the second switch unit was first turned off and the first switch unit was then turned off. Here, the present invention is not limited to the above-mentioned code expressions indicating the most recent turn-off order of the switch units, and various modifications could be made thereto without departing from the spirit and scope of the invention. The turn-off number and order of the switch units is stored in the memory 54 as digital data.

TABLE 1

| Current range | The turn-off number of a first switch unit (whether or not a first switch unit was turned off recently) | The turn-off number of a second switch unit (whether or not a second switch unit was turned off recently) |
|---|---|---|
| Low(≤10 A) | 2 (0) | 3 (1) |
| Middle(10 A~50 A) | 2 (1) | 1 (0) |
| High(50 A≥) | 4 (0) | 4 (1) |

A process for controlling the turn-off order of the switch units is described in detail with reference to the above-mentioned Table 1 and FIG. 2 as follows.

As an example, assuming that a magnitude level of discharge current applied from the battery pack 10 to the load 40 is 5A. In this case, the control unit 52 reads the turn-off numbers of the first and second switch units 20 and in a current range corresponding to 5A, i.e., a low current range, among current ranges stored in the memory 54. According to the table 1, the turn-off number of the first switch unit 20 is smaller than that of the second switch unit 30 by 1. Thus, the control unit 52 compares the turn-off numbers of the first and second switch units 20 and 30, and first turns off the first switch unit 20 having a smaller turn-off number than the second switch unit 30, and then turns off the second switch unit 30.

As another example, assuming that a magnitude level of discharge current applied from the battery pack 10 to the load 40 is 30A. In this case, the control unit 52 reads the turn-off numbers of the first and second switch units 20 and 30 in a current range corresponding to 30A, i.e., a middle current range, among current ranges stored in the memory 54. According to the table 1, the turn-off number of the second switch unit 30 is smaller than that of the first switch unit 20 by 1. Thus, the control unit 52 compares the turn-off numbers of the first and second switch units 20 and 30, and first turns off the second switch unit 30 having a smaller turn-off number than the first switch unit 20, and then turns off the first switch unit 20.

As yet another example, assuming that a magnitude level of discharge current applied from the battery pack 10 to the load 40 is 60A. In this case, the control unit 52 reads the turn-off numbers of the first and second switch units 20 and 30 in a current range corresponding to 60A, i.e., a high current range, among current ranges stored in the memory 54. According to the table 1, the turn-off number of the first switch unit 20 is the same as that of the second switch unit 30. In this case, the control unit 52 reads the turn-off order of the first and second switch units 20 and 30 from the memory 54, determines which switch unit was not turned off most recently, and first turns off the determined switch unit. That is, in this example, because the second switch unit 30 was turned off most recently, the control unit 52 first turns off the first switch unit 20, and then turns off the second switch unit 30.

The exemplary low, middle and high current ranges are just for the purpose of illustration only, and various modifications could be made thereto without departing from the spirit and scope of the invention.

Meanwhile, FIG. 2 does not show a feature for measuring a magnitude level of discharge current flowing from the battery pack 10 to the load 40 and storing the measured magnitude level in the memory 54. However, a discharge current measuring technique could be easily implemented using well-known techniques.

As an example, a current sensor 31 may be installed on a line where a discharge current flows, and the control unit 52 may receive a discharge current value outputted from the current sensor 31 and store the value in the memory 54. As another example, a current measuring resistor may be installed on a line where a discharge current flows, and the control unit 52 may detect a voltage difference between both terminals of the current measuring resistor of which resistance is known, calculate a discharge current value in accordance with Ohm's law, and store the value in the memory 54. As yet another example, the control unit 52 may receive a discharge current value from an apparatus having the load 40 mounted therein and store the value in the memory 54. For example, in the case that the load 40 is a motor of a vehicle, a battery management system 10' mounted in the vehicle detects a discharge current supplied to the motor and continuously monitors the discharge current value, and the control unit 52 may receive the discharge current value from the battery management system 10' through a communication interface and store the value in the memory 54. It is obvious to an ordinary person skilled in the art that the present invention is not limited to a specific method for obtaining a magnitude level of discharge current by the control unit 52, and various modifications could be made thereto without departing from the spirit and scope of the invention.

It is obvious that the present invention is not limited to a specific location where the apparatus of the present invention is installed. For example, the apparatus may be installed in a battery pack or a battery management system 10' for controlling charge and discharge of a battery.

Figure 3:
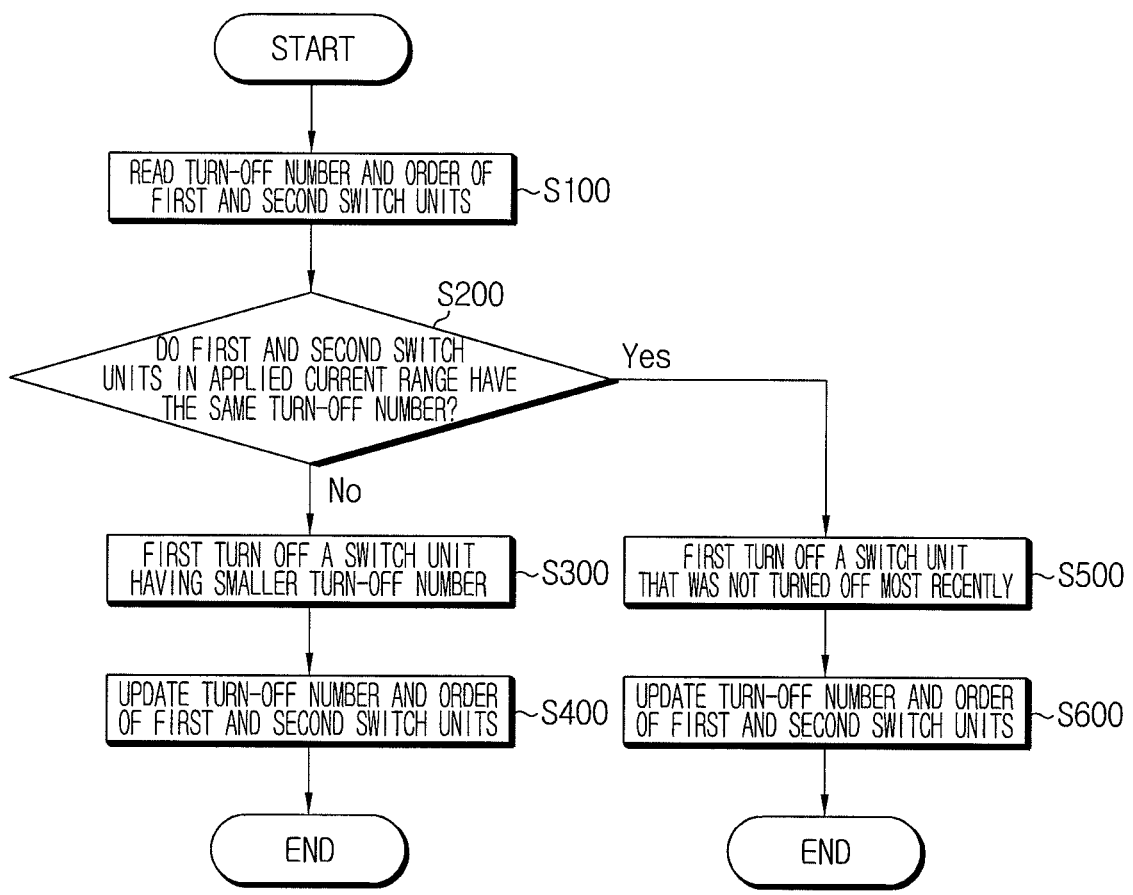
FIG. 3 is a flowchart illustrating a method of controlling switch units between a battery pack and a load according to a preferred embodiment of the present invention.

FIG. 3 is a flowchart illustrating a method of controlling switch units between a battery pack and a load according to a preferred embodiment of the present invention.

First, if there is a connection release request between the battery pack and the load, the control unit 52 reads, from the memory 54, a magnitude level of discharge current applied from the battery pack 10 to the load 40, and reads the turn-off number and order of first and second switch units 20 and 30 in a current range corresponding to the read magnitude level of discharge current (S100).

Next, the control unit 52 determines whether or not the first and second switch units 20 and 30 in the read current range have the same turn-off number (S200).

If it is determined in the step S200 that the first and second switch units 20 and 30 do not have the same turn-off number, the control unit 52 first turns off a switch unit having a smaller turn-off number and then turns off the other switch unit (S300). In this way, the connection between the battery pack 10 and the load 40 is completely released.

The control unit 52 may update the turn-off number and order of the first and second switch units 20 and 30 in a current range corresponding to the magnitude level of discharge current and store the updated turn-off number and order in the memory 54 (S400). The step S400 is performed for the purpose of referring to the turn-off number and order in a subsequent step for releasing the connection between the battery pack 10 and the load 40.

Meanwhile, if it is determined in the step S200 that the first and second switch units 20 and 30 have the same turn-off number, the process proceeds to the step S500. In the step S500, the control unit 52 may identify a switch unit that was turned off most recently. And, the control unit 52 may first turn off a switch unit that was not turned off most recently and then turn off the other switch unit (S500). For example, if the first switch unit 20 was turned off most recently, the second switch unit 30 is first turned off and then first switch unit 20 is turned off. In this way the connection between the battery pack 10 and the load 40 is completely released.

In the step S600, the control unit 52 may update the turn-off number and order of the first and second switch unit 20 and 30 in a current range corresponding to the magnitude level of discharge current and store the updated turn-off number and order in the memory 54. The step S600 is performed for the purpose of referring to the turn-off number and order in a subsequent step for releasing the connection between the battery pack 10 and the load 40.

As mentioned above, the turn-off number of the first and second switch unit 20 and 30 connecting the battery pack 10 with the load 40 are equalized according to a magnitude level of discharge current, so that it prevents increase of the frequency of breakdown or malfunction of a specific switch unit due to relative concentration of electric arc damage and reduction in the using period of the switch unit.

In particular, the present invention differentially manages the turn-off number and order of the switch units according to a magnitude level of discharge current, thereby preventing concentration of damage on any one of the switch units more effectively. That is, if the turn-off order of the switch units is managed irrespective of current range, even though a switch unit having a smaller turn-off number is first turned off, concentration of damage on any one of the switch units may occur. This is because even a switch unit having a smaller turn-off number may be damaged more severely than a switch unit having a larger turn-off number if it is often turned off under a large discharge current environment. However, the present invention fundamentally solves the problem by equalizing the turn-off number of the switch units according to a magnitude level of discharge current.

Applicability to the Industry

The present invention equalizes the turn-off number of switch units between a battery pack and a load according to a magnitude level of discharge current applied to the load when releasing a connection between the battery pack and the load, thereby reducing the frequency of breakdown or malfunction of the switch units and increasing the using period of the switch units.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An apparatus of controlling switch units between a battery pack and a load, comprising:
   a memory for storing the turn-off number of a first switch unit and a second switch unit connecting the battery pack with the load according to current ranges; and
   a control unit for equalizing the turn-off number of the first switch unit and the second switch unit with reference to the turn-off number in a current range corresponding to a magnitude level of discharge current of a battery.

2. The apparatus of controlling switch units between a battery pack and a load according to claim 1,
   wherein the first switch unit is installed on a high potential line connecting a cathode of the battery pack with the load, and
   wherein the second switch unit is installed on a low potential line connecting an anode of the battery pack with the load.

3. The apparatus of controlling switch units between a battery pack and a load according to claim 2, further comprising:
   a free charge switch unit installed on a bypass line of the high potential line; and
   a current limiting resistor connected in series with the free charge switch unit.

4. The apparatus of controlling switch units between a battery pack and a load according to claim 3,
   wherein, when connecting the battery pack with the load, the control unit turns on the second switch unit, the free charge switch unit and the first switch unit in sequence, and after the first switch unit is turned on and a predetermined time passes, turns off the free charge switch unit.

5. The apparatus of controlling switch units between a battery pack and a load according to claim 1,
   wherein, when releasing the connection between the battery pack and the load, the control unit detects a magnitude level of discharge current, reads, from the memory, the turn-off number of the switch units in a current range corresponding to the magnitude level of discharge current among current ranges stored in the memory, and equalizes the turn-off number of the first switch unit and the second switch unit using the read turn-off number the switch units.

6. The apparatus of controlling switch units between a battery pack and a load according to claim 1,
wherein the control unit first turns off a switch unit having a smaller turn-off number among the first switch unit and the second switch unit.

7. The apparatus of controlling switch units between a battery pack and a load according to claim 1,
wherein the memory further stores the turn-off order of the first switch unit and the second switch unit, and
wherein, in the case that the first switch unit and the second switch unit have the same turn-off number, the control unit first turns off a switch unit that was not turned off most recently by referring to the turn-off order of the first switch unit and the second switch unit.

8. The apparatus of controlling switch units between a battery pack and a load according to claim 7,
wherein the control unit updates the turn-off order of the first switch unit and the second switch unit in a current range corresponding to a magnitude level of discharge current at the point of time when the connection between the battery pack and the load is released, and stores the updated turn-off order in the memory.

9. The apparatus of controlling switch units between a battery pack and a load according to claim 1,
wherein the control unit updates the turn-off number of the first switch unit and the second switch unit in a current range corresponding to a magnitude level of discharge current at the point of time when the connection between the battery pack and the load is released, and stores the updated turn-off number in the memory.

10. A battery pack comprising the apparatus of controlling switch units between a battery pack and a load, according to claim 1.

11. A battery management system comprising the apparatus of controlling switch units between a battery pack and a load, according to claim 1.

12. A method of controlling switch units between a battery pack and a load, comprising:
(a) storing the turn-off number of a first switch unit and a second switch unit connecting the battery pack with the load in a memory according to current ranges;
(b) detecting a magnitude level of discharge current of a battery at the point of time when a connection between the battery pack and the load is released; and
(c) releasing the connection between the battery pack and the load on condition that the turn-off number of the first switch unit and the second switch unit is equalized with reference to the turn-off number of the first switch unit and the second switch unit in a current range stored in the memory, the current range being corresponding to the detected magnitude level of discharge current.

13. The method of controlling switch units between a battery pack and a load according to claim 12,
wherein, in the step (c), the connection between the battery pack and the load is released by first turning off a switch unit having a smaller turn-off number among the first switch unit and the second switch unit.

14. The method of controlling switch units between a battery pack and a load according to claim 12, further comprising the step of storing the turn-off order of the first switch unit and the second switch unit in the memory according to the current ranges,
wherein, in the step (c), in the case that the first switch unit and the second switch unit have the same turn-off number, the connection between the battery pack and the load is released by first turning off a switch unit that was not turned off most recently by referring to the turn-off order of the first switch unit and the second switch unit in the memory.

15. The method of controlling switch units between a battery pack and a load according to claim 14, further comprising:
determining a current range corresponding to a magnitude level of discharge current in the memory when the connection between the battery pack and the load is released; and
updating the turn-off order of the first switch unit and the second switch unit in the determined current range, and storing the updated turn-off order in the memory.

16. The method of controlling switch units between a battery pack and a load according to claim 12,
wherein the step (c) comprises:
determining a current range corresponding to the detected magnitude level of discharge current, among current ranges stored in the memory;
reading the turn-off number of the first switch unit and the second switch unit in the determined current range from the memory; and
releasing the connection between the battery pack and the load on condition that the turn-off number of the first switch unit and the second switch unit is equalized with reference to the read turn-off number in the memory.

17. The method of controlling switch units between a battery pack and a load according to claim 12, further comprising:
determining a current range corresponding to a magnitude level of discharge current in the memory when the connection between the battery pack and the load is released; and
updating the turn-off number of the first switch unit and the second switch unit in the determined current range, and storing the updated turn-off number in the memory.

18. The method of controlling switch units between a battery pack and a load according to claim 12,
wherein the first switch unit is installed on a high potential line connecting a cathode of the battery pack with the load, and the second switch unit is installed on a low potential line connecting an anode of the battery pack with the load.

19. The method of controlling switch units between a battery pack and a load according to claim 18, further comprising:
providing a free charge switch unit on a bypass line of the high potential line,
wherein, before the step (b), the second switch unit, the free charge switch unit and the first switch unit are turned on in sequence, and after the first switch unit is turned on and a predetermined time passes, the free charge switch unit is turned off.

* * * * *